US011282106B1

(12) United States Patent
Uy et al.

(10) Patent No.: US 11,282,106 B1
(45) Date of Patent: Mar. 22, 2022

(54) DYNAMIC OPTIMIZATION OF ADVERTISING CAMPAIGNS

(71) Applicant: CSC Holdings, LLC, Bethpage, NY (US)

(72) Inventors: Robert Reimer Uy, New York, NY (US); Jason Glushakow, Jersey City, NJ (US); Indu Narayan, New York, NY (US)

(73) Assignee: CSC Holdings, LLC, Bethpage, NY (US)

( * ) Notice: Subject to any disclaimer, the term of this patent is extended or adjusted under 35 U.S.C. 154(b) by 726 days.

(21) Appl. No.: 15/294,925

(22) Filed: Oct. 17, 2016

(51) Int. Cl.
*G06Q 30/02* (2012.01)
*H04L 65/60* (2022.01)
(Continued)

(52) U.S. Cl.
CPC ..... *G06Q 30/0244* (2013.01); *G06Q 30/0264* (2013.01); *H04L 65/60* (2013.01); *H04L 67/325* (2013.01); *H04L 69/323* (2013.01)

(58) Field of Classification Search
CPC .................................................... G06Q 30/00
See application file for complete search history.

(56) References Cited

U.S. PATENT DOCUMENTS

| 4,907,085 | A | * | 3/1990 | Bingham | ................. | H04B 1/20 |
| | | | | | | 348/706 |
| 6,286,005 | B1 | * | 9/2001 | Cannon | ................. | G06Q 30/02 |
| | | | | | | 455/2.01 |

(Continued)

OTHER PUBLICATIONS

Day, J.D., Zimmermann, H.: 'The OSI reference model', Proc. IEEE, 1983, 71, (21), pp. 1334-1340.*

*Primary Examiner* — Eric R Netzloff
(74) *Attorney, Agent, or Firm* — Sterne, Kessler, Goldstein & Fox P.L.L.C.

(57) ABSTRACT

The present disclosure describes a dynamic optimization of delivery of one or more advertising messages of an advertising campaign. The various apparatuses and methods disclosed herein deliver the one or more advertising messages to a targeted audience of the advertising campaign. Thereafter, these apparatuses and methods monitor exposure of the targeted audience to the one or more advertising messages to generate an advertisement exposure list. This list can include members of the targeted audience that have not been exposed to the one or more advertising messages, members of the targeted audience that have been exposed to the one or more advertising messages less than an optimal frequency of exposure, and/or members of the targeted audience that have been exposed to the one or more advertising messages greater than or equal to the optimal frequency of exposure. Finally, these apparatuses and methods optimize the delivery of the one or more advertising messages to the members of the targeted audience that have not been exposed to the one or more advertising messages and/or the members of the targeted audience that have been exposed to the one or more advertising messages less than the optimal frequency of exposure as indicated in the advertisement exposure list when the one or more advertising messages fail to reach the members of the targeted audience that have not been exposed to the one or more advertising messages and/or are exposed to the one or more advertising messages less than the optimal frequency of exposure.

19 Claims, 8 Drawing Sheets

(51) Int. Cl.
*H04L 69/323* (2022.01)
*H04L 67/62* (2022.01)

(56) References Cited

U.S. PATENT DOCUMENTS

| | | | |
|---|---|---|---|
| 6,750,919 B1* | 6/2004 | Rosser | H04N 5/272 |
| | | | 348/584 |
| 8,352,981 B1* | 1/2013 | Oztaskent | G06Q 30/02 |
| | | | 725/34 |
| 2004/0075670 A1* | 4/2004 | Bezine | H04N 5/44504 |
| | | | 345/619 |
| 2005/0025145 A1* | 2/2005 | Rakib | H04J 3/0682 |
| | | | 370/389 |
| 2005/0229209 A1* | 10/2005 | Hildebolt | H04N 21/47202 |
| | | | 725/42 |
| 2009/0248478 A1* | 10/2009 | Duggal | G06Q 30/0243 |
| | | | 705/14.42 |
| 2010/0131975 A1* | 5/2010 | Landow | H04N 7/17318 |
| | | | 725/34 |
| 2012/0310717 A1* | 12/2012 | Kankainen | G06Q 30/02 |
| | | | 705/14.4 |
| 2013/0205339 A1* | 8/2013 | Haberman | H04N 21/812 |
| | | | 725/35 |
| 2016/0373793 A1* | 12/2016 | Meyer | G06Q 30/0241 |
| 2017/0323332 A1* | 11/2017 | Brixius | G06Q 30/0246 |

\* cited by examiner

DYNAMIC OPTIMIZATION OF ADVERTISING CAMPAIGNS

BACKGROUND

Advertising is a form of marketing communication used for promoting or selling a product or service. The purpose of advertising is to convince customers that a company's services or products are the best, enhance the image of the company, point out and create a need for products or services, demonstrate new uses for established products, announce new products and programs, reinforce the company messages, draw customers to the company, and to retain existing customers. An advertising campaign represents one or more advertisement messages that share one or more ideas and/or themes. Modern advertising campaigns often combine multiple online and offline channels such as online social media, television, and/or out-of-home media to provide some examples.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 3:
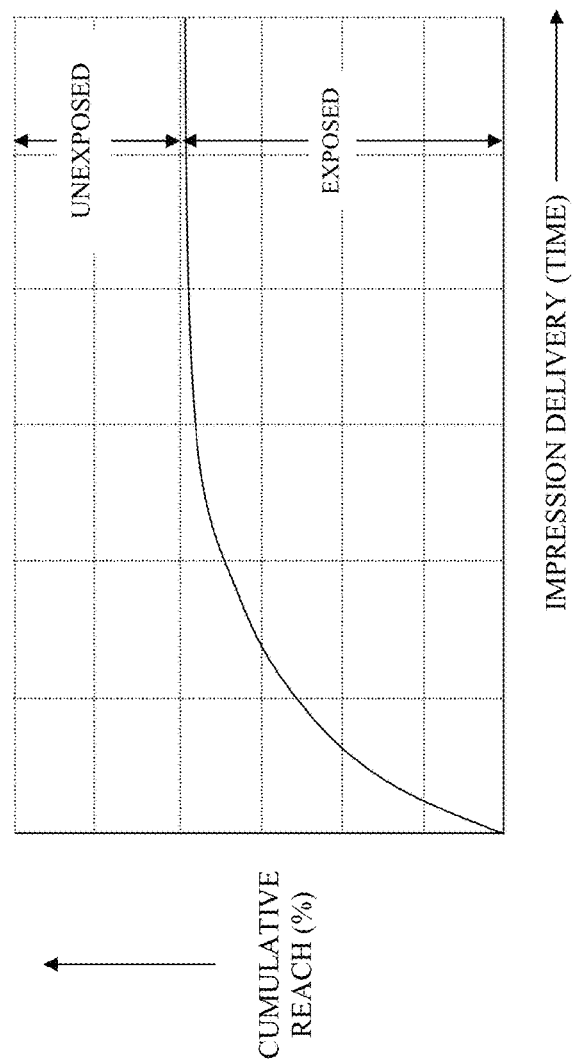
Figure 4:
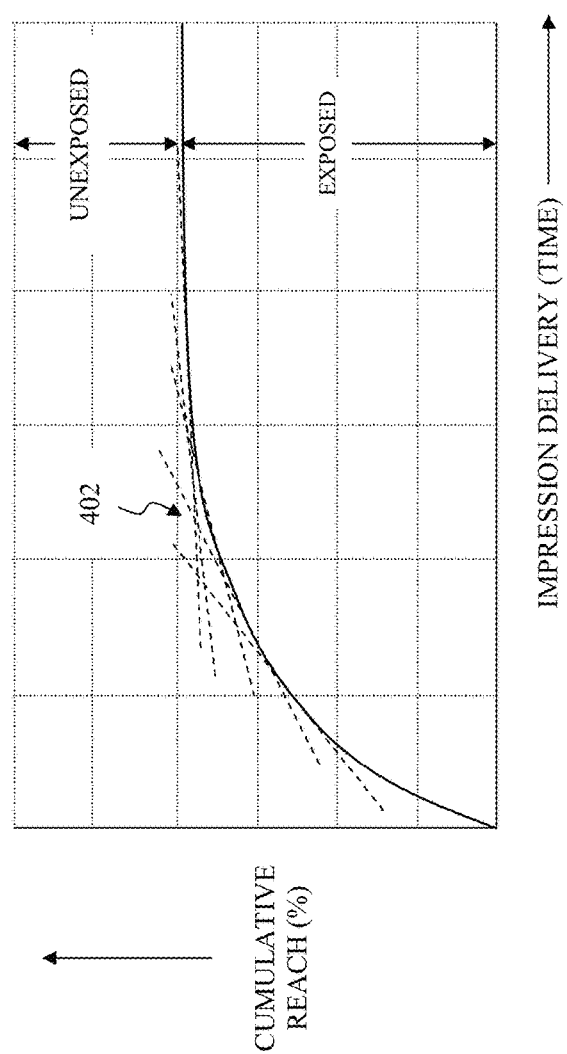
Figure 5:
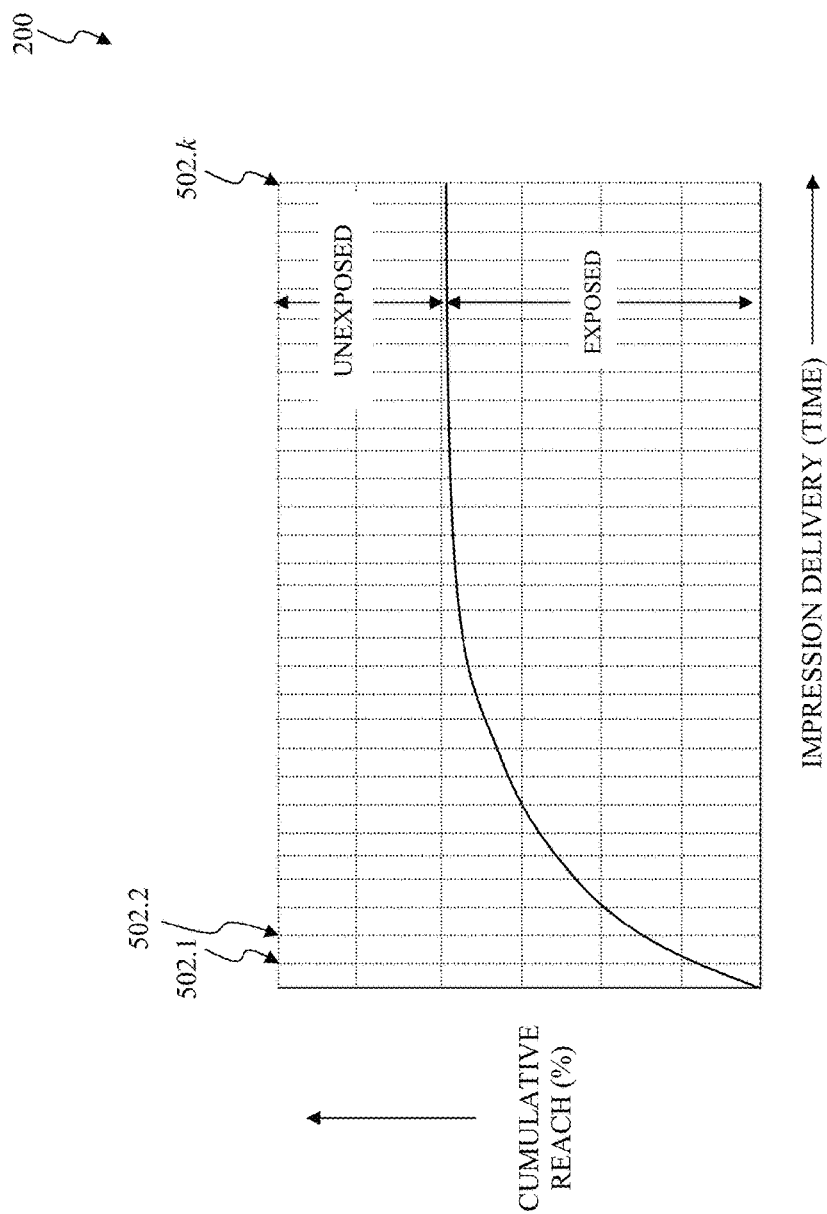
Figure 6:
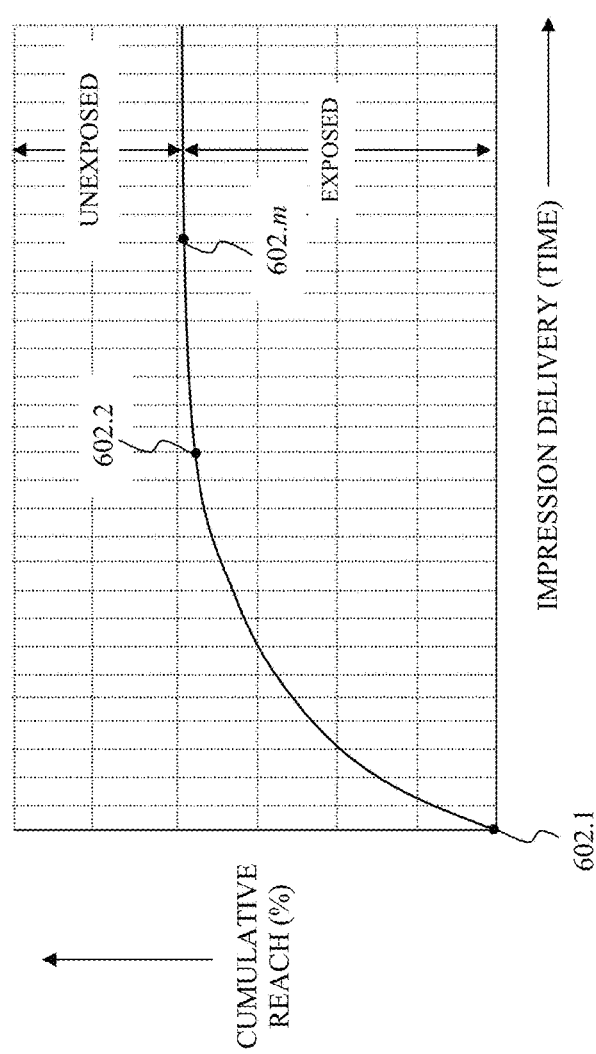
Figure 7:
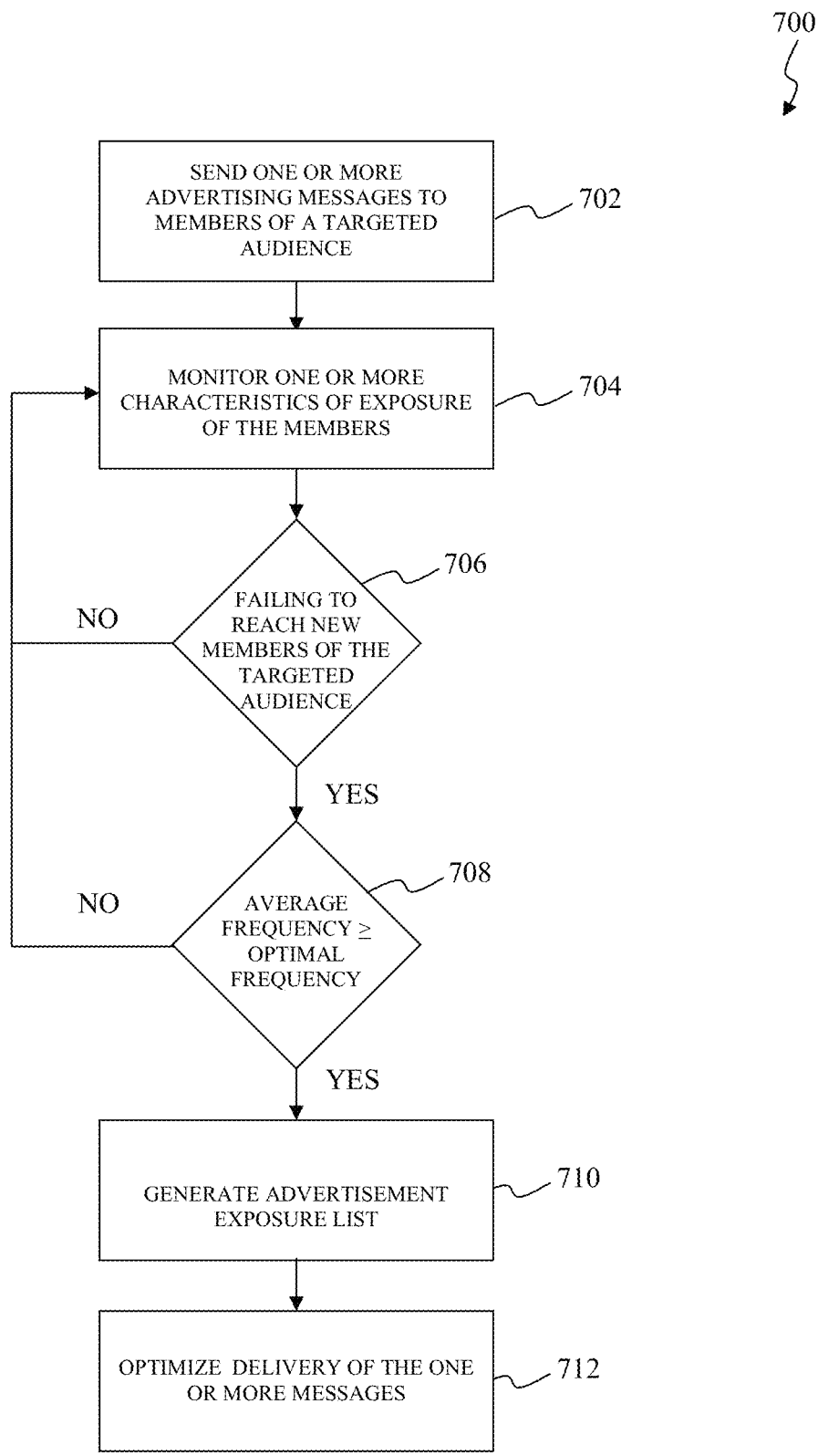

FIG. 3 graphically illustrates an exemplary audience cumulative reach curve of one or more advertisement messages of an advertising campaign according to an embodiment of the present disclosure;

FIG. 4 graphically illustrates an operation to measure an impression delivery of the exemplary audience cumulative reach curve according to an embodiment of the present disclosure;

FIG. 5 graphically illustrates a dynamic interval measurement (DIM) of the exemplary audience cumulative reach curve according to an embodiment of the present disclosure;

FIG. 6 graphically illustrates an operation to optimize the delivery of the one or more messages of the advertising campaign according to an embodiment of the present disclosure; and FIG. 7 is a flowchart of exemplary operational steps in optimizing delivery of one or more advertising messages of the advertising campaign according to an embodiment of the present disclosure.

The present disclosure will now be described with reference to the accompanying drawings.

DETAILED DESCRIPTION OF THE DISCLOSURE

Overview

The present disclosure describes a dynamic optimization of delivery of one or more advertising messages of an advertising campaign. The various apparatuses and methods disclosed herein deliver the one or more advertising messages to a targeted audience of the advertising campaign. Thereafter, these apparatuses and methods monitor exposure of the targeted audience to the one or more advertising messages to generate an advertisement exposure list. This list can include members of the targeted audience that have not been exposed to the one or more advertising messages, members of the targeted audience that have been exposed to the one or more advertising messages less than an optimal frequency of exposure, and/or members of the targeted audience that have been exposed to the one or more advertising messages greater than or equal to the optimal frequency of exposure. Finally, these apparatuses and methods optimize the delivery of the one or more advertising messages to the members of the targeted audience that have not been exposed to the one or more advertising messages and/or the members of the targeted audience that have been exposed to the one or more advertising messages less than the optimal frequency of exposure as indicated in the advertisement exposure list when the one or more advertising messages fail to reach the members of the targeted audience that have not been exposed to the one or more advertising messages and/or are exposed to the one or more advertising messages less than the optimal frequency of exposure.

Exemplary Point-to-Multipoint Communication System

Figure 1A:
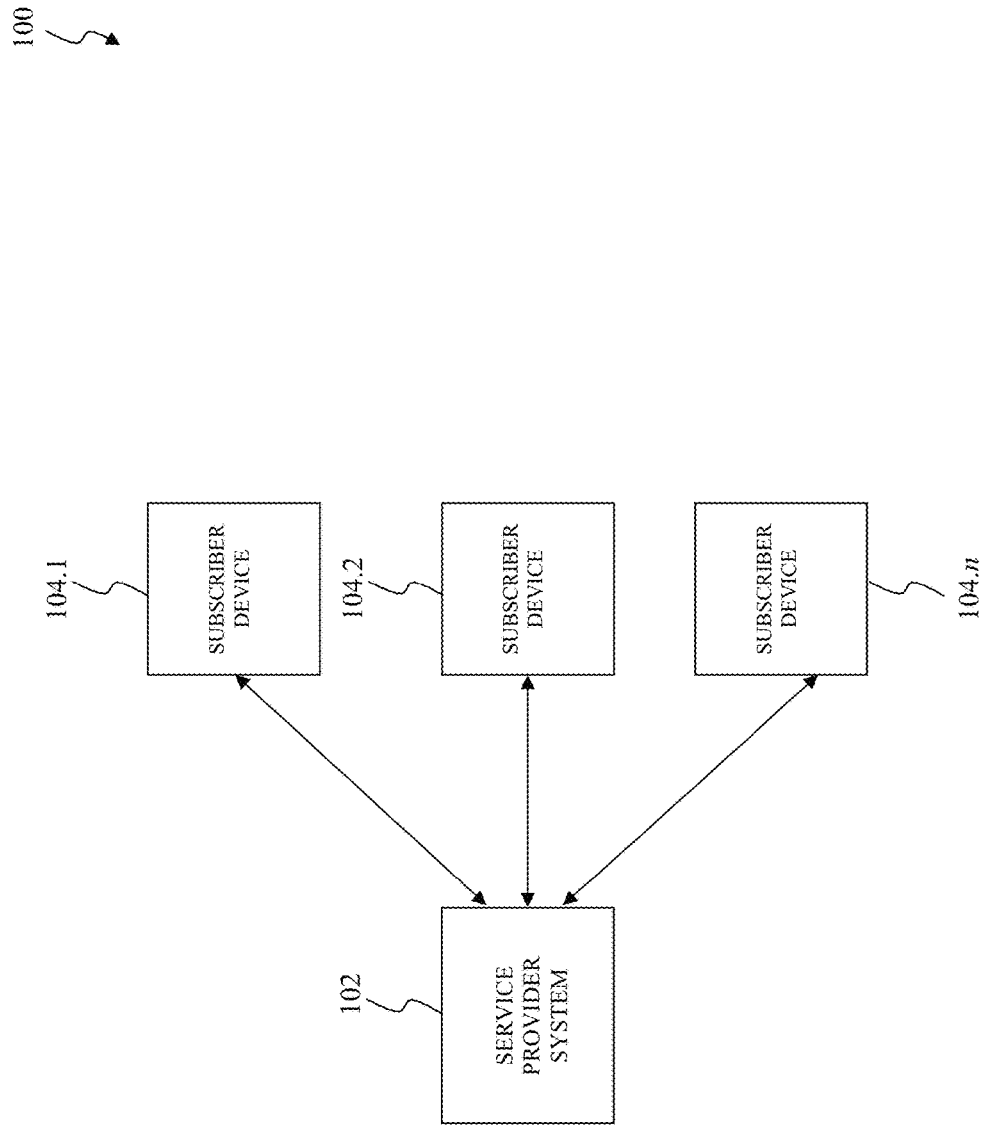
FIG. 1A illustrates a block diagram of an exemplary point-to-multipoint communication system according to an embodiment of the present disclosure.

FIG. 1A illustrates a block diagram of an exemplary point-to-multipoint communication system according to an embodiment of the present disclosure. A communications system 100 includes a service provider system 102 to provide a service, such bi-directional communication of video, audio, and/or data to provide some examples, to subscriber devices 104.1 through 104.n. The subscriber devices 104.1 through 104.n represent one or more personal computers, data terminal equipment, one or more telephony devices, such as one or more mobile phones or one or more mobile computing devices to provide some examples, one or more broadband media players, one or more network controlled appliances, one or more set-top boxes, and/or other devices that are capable of transmitting and/or receiving video, audio, and/or data that will be apparent to those skilled in the relevant art(s). As used herein, the term "downstream direction" refers to the transfer of information in a first direction from the service provider system 102 to the subscriber devices 104.1 through 104.n. The term "upstream direction" refers to the transfer of information in a second direction from the subscriber devices 104.1 through 104.n to the service provider system 102.

The service provider system 102 manages the upstream direction and the downstream direction transfer of information to and/or from the subscriber devices 104.1 through 104.n. This transfer of information can use any suitable wireless communication and/or wired communication that will be apparent to those skilled in the relevant art(s) without departing from the spirit and scope of the present disclosure. As illustrated in FIG. 1A, the service provider system 102 provides information in the downstream direction to the subscriber devices 104.1 through 104.n. This information can include audio data, video data, such as a television program, movie, or interactive content to provide some examples, and/or digital data, such as one or more webpages of a website, an electronic programing guide, or a software application to provide some examples. In an exemplary embodiment, this interactive content can represent dedicated channel content, such as a channel position dedicated to an advertiser, that allows interaction with content of the dedicated channel. In this exemplary embodiment, the content can include an overlay, such as an advertisement with an overlay to provide an example, to allow the interaction. In some situations, the information can include one or more advertising messages used to promote or to sell a product or service. In another exemplary embodiment, the one or more advertising messages can be part of an advertising campaign that share one or more ideas and/or themes. The one or more advertising messages can be integrated within the audio data, the video data, and/or the digital data. For example, the one or more advertising messages can be placed at specialized locations between various segments of the television program, the movie, or the interactive content, overlaid at specialized locations within the television program, the movie, or the interactive content as the television program, the movie, or the interactive content is being viewed, or placed within various locations of the one or more webpages of the website or the electronic programing guide.

As additionally illustrated in FIG. 1A, the service provider system 102 receives information in the upstream direction from the subscriber devices 104.1 through 104.$n$. This information can include information relating to the operation of the subscriber devices 104.1 through 104.$n$. For example, this information can include one or more television programs, movies, or interactive contents, or information relating to the one or more television programs, movies, or interactive contents, that the subscriber devices 104.1 through 104.$n$ have played, one or more websites, or information relating to the one or more websites, that the subscriber devices 104.1 through 104.$n$ have visited, and/or one or more software applications, or information relating to the one or more software applications, that the subscriber devices 104.1 through 104.$n$ have executed. As another example, this information can include one or more commands that have been provided, for example, by a remote control, to the subscriber devices 104.1 through 104.$n$. The information provided by the subscriber devices 104.1 through 104.$n$ allows the service provider system 102 to determine which subscriber devices from among the subscriber devices 104.1 through 104.$n$ have been exposed to the one or more advertising messages and, optionally, frequencies of exposure of these subscriber devices to the one or more advertising messages to determine whether to optimize delivery of the one or more advertising messages. The discussion to follow describes various operations of the service provider system 102 to optimize delivery of the one or more advertising messages, namely the exposure of the subscriber devices 104.1 through 104.$n$ to the one or more advertising messages.

Exemplary Cable Communication System

Figure 1B:
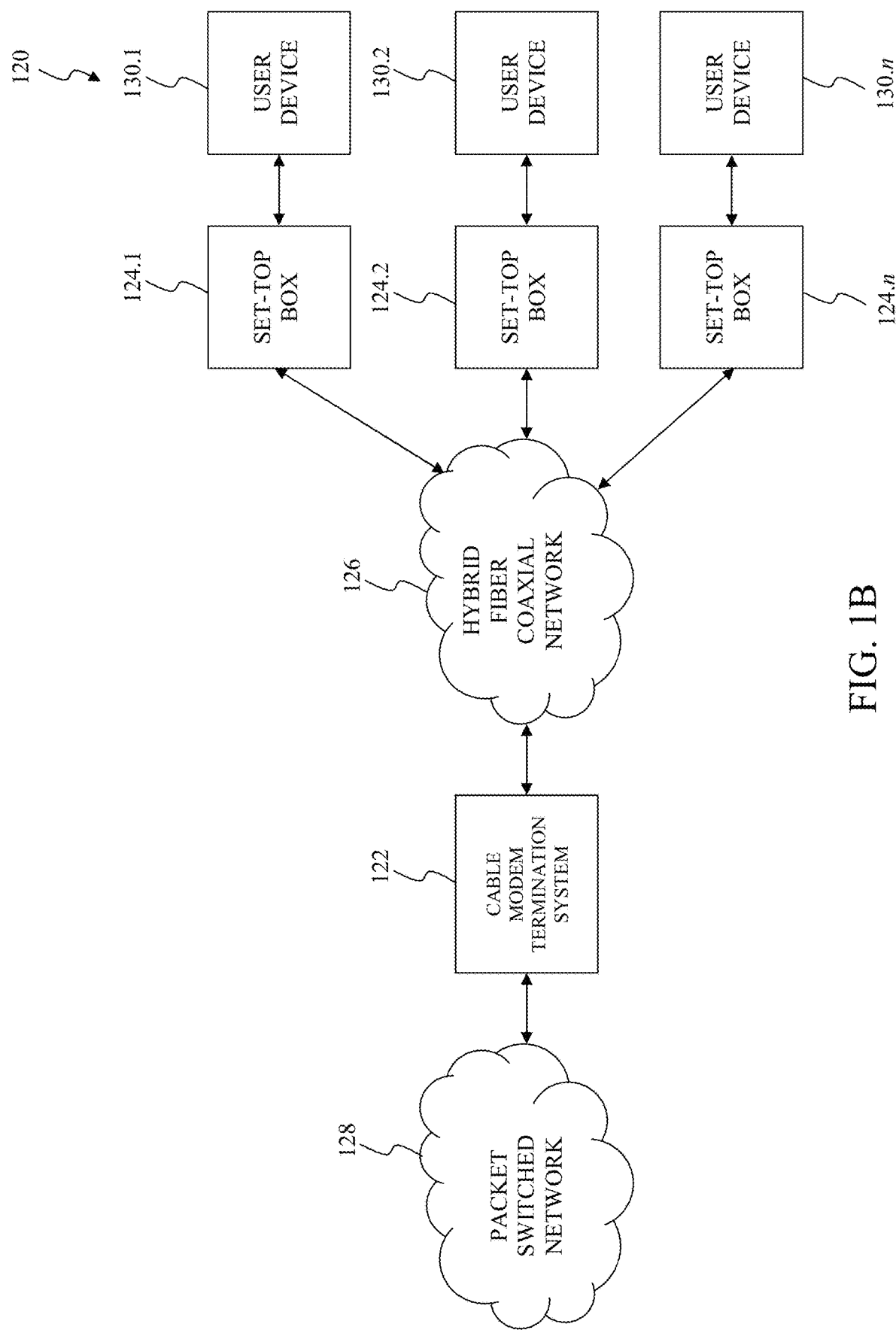
FIG. 1B illustrates a block diagram of an exemplary cable communication system according to an embodiment of the present disclosure.

FIG. 1B illustrates a block diagram of an exemplary cable communication system according to an embodiment of the present disclosure. A cable communications system 120 facilitates bi-directional communication of information, such as video, audio, and/or data to provide some examples, between a cable modem termination system (CMTS) 122 and set-top boxes 124.1 through 124.$n$ via a communications network 126, such as a hybrid fiber coaxial (HFC) cable network to provide an example. In an exemplary embodiment, the CMTS 122 and the set-top boxes 124.1 through 124.$n$ communicate with each other using a bi-directional transfer of packet-based traffic, such as Internet Protocol (IP) traffic to provide an example. The cable communications system 120 can represent an exemplary embodiment of the communications system 100.

The CMTS 122 manages the upstream direction and the downstream direction transfer of information to and/or from the set-top boxes 124.1 through 124.$n$ in a substantially similar manner as the service provider system 102 as described in FIG. 1A. For example, the CMTS 122 provides information in the downstream direction to the set-top boxes 124.1 through 124.$n$. This information can include the audio data, the video data and/or the digital data and the one or more advertising messages as described in FIG. 1A. As another example, the CMTS 122 receives information in the upstream direction from the set-top boxes 124.1 through 124.$n$. This information can include information relating to the operation of the set-top boxes 124.1 through 124.$n$ as described in FIG. 1A. The CMTS 122 can utilize this information to determine the exposure of the set-top boxes 124.1 through 124.$n$ to the advertising message as described in FIG. 1A.

Referring back to FIG. 1B, the CMTS 122 additionally operates as an interface between the HFC network 126 and a packet switched network 128 to transfer the information received from the set-top boxes 124.1 through 124.$n$ to the packet switched network 128 and to transfer information received from the packet switched network 128 to the set-top boxes 124.1 through 124.$n$. The HFC network 126 provides a point-to-multipoint topology for high speed, reliable, and secure transport of information between the CMTS 122 and the set-top boxes 124.1 through 124.$n$. As will be appreciated by those skilled in the relevant art(s), the HFC network 126 may include coaxial cable, fiber optic cable, or a combination of coaxial cable and fiber optic cable linked via one or more fiber nodes, and may include frequency translation devices in support of a frequency stacking architecture, and may even include wireless links without departing from the spirit and scope of the present disclosure.

The set-top boxes 124.1 through 124.$n$ operate as an interface between the HFC network 126 and user devices 130.1 through 130.$n$. In an exemplary embodiment, the set-top boxes 124.1 through 124.$n$ can be located in households of residential members of the targeted audience and/or in a commercial premises of commercial members of the targeted audience. As illustrated in FIG. 1B, the set-top boxes 124.1 through 124.$n$ convert information received over the HFC network 126 in the downstream direction into information to be received by the user devices 130.1 through 130.$n$. For example, the set-top boxes 124.1 through 124.$n$ convert the audio data, the video data and/or the digital data as well as the one or more advertising messages integrated within the audio data, the video data, and/or the digital data as described in FIG. 1A into the information to be received by the user devices 130.1 through 130.$n$. Additionally, the set-top boxes 124.1 through 124.$n$ convert information received from the user devices 130.1 through 130.$n$ into information suitable for transfer over the HFC network 126 in the upstream direction. This information can include operational information relating to the operation of the set-top boxes 124.1 through 124.$n$. For example, this information can include tuning data for one or more of the set-top boxes 124.1 through 124.$n$ which represents one or more channels that the set-top boxes 124.1 through 124.$n$ are tuned to, one or more websites, or information relating to the one or more websites, that the set-top boxes 124.1 through 124.$n$ have visited, and/or one or more software applications, or information relating to the one or more software applications, that the set-top boxes 124.1 through 124.$n$ have executed.

The user devices 130.1 through 130.$n$ represent one or more personal computers, data terminal equipment, one or more telephony devices, one or more broadband media players, one or more network controlled appliances, and/or other devices that are capable of transmitting and/or receiving data over a packet switched network. In the downstream direction, the user devices 130.1 through 130.n provide access to the information provided by the set-top boxes 124.1 through 124.n. For example, the user devices 130.1 through 130.n can play the audio data as well as the one or more advertising messages integrated within the audio data and/or display the video data and/or the digital data as well as the one or more advertising messages integrated within the video data, and/or the digital data. Additionally, the user devices 130.1 through 130.n provide information to the set-top boxes 124.1 through 124.n relating to the operation of the user devices 130.1 through 130.n for transfer to the CMTS 122. For example, this information can include one or more websites, or information relating to the one or more websites, that the user devices 130.1 through 130.n have visited, and/or one or more software applications or information relating to the one or more software applications, that the user devices 130.1 through 130.n have executed.

Figure 2:
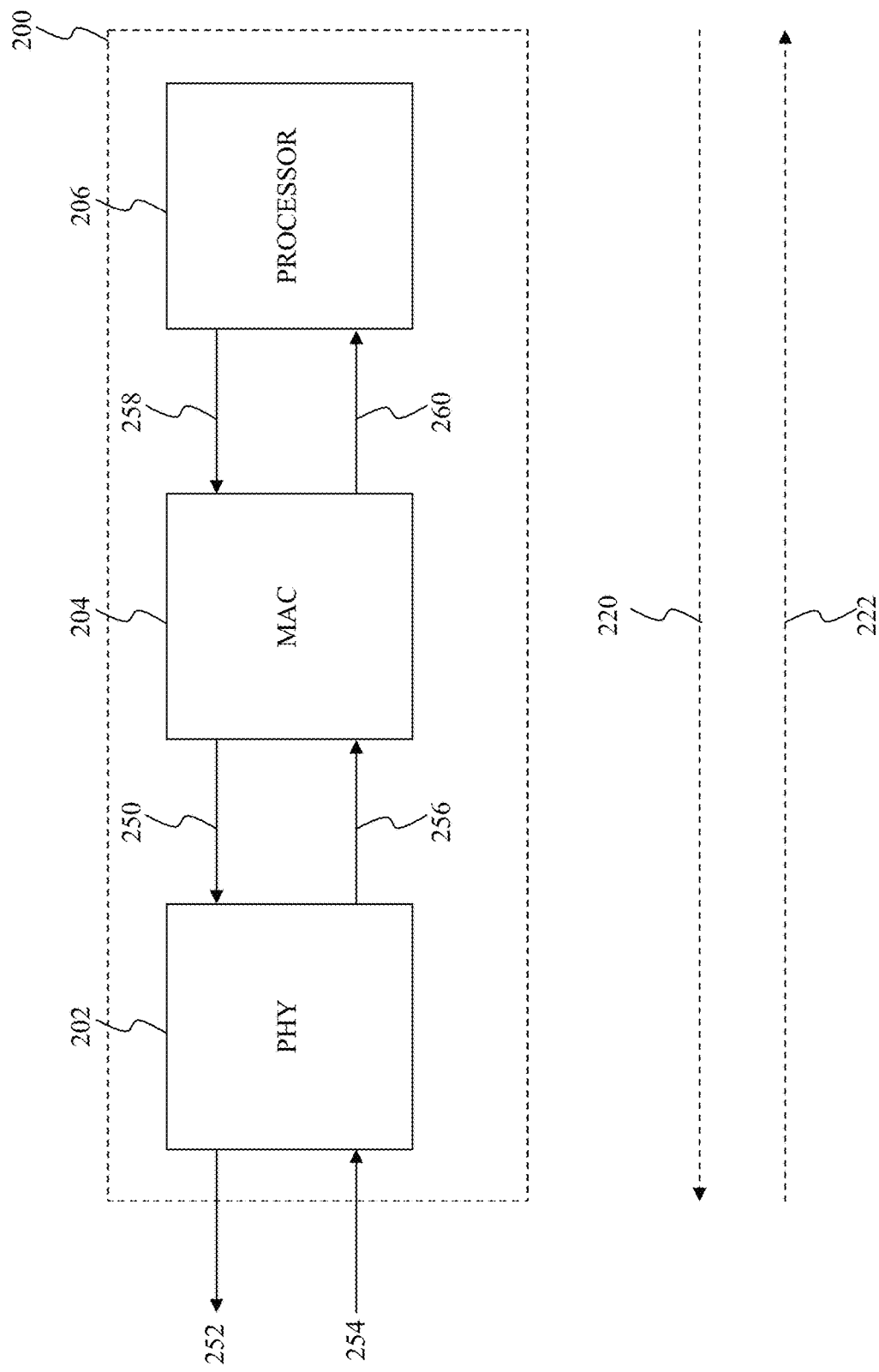
FIG. 2 illustrates a block diagram of a service provider system of the exemplary point-to-multipoint communication system according to an embodiment of the present disclosure.

Exemplary Service Provider System of the Point-to-Multipoint Communication System FIG. 2 illustrates a block diagram of a service provider system of the exemplary point-to-multipoint communication system according to an embodiment of the present disclosure. A service provider system 200 provides one or more advertising messages of an advertising campaign in a downstream direction 220 to one or more subscriber devices, such as one or more of the subscriber devices 104.1 through 104.n to provide an example. The one or more advertising messages can be integrated within audio data, video data, such as a television program, movie, or interactive content to provide some examples, and/or digital data, such as one or more webpages of a website, an electronic programing guide, a software application to provide some examples. The service provider system 200 additionally receives operational information, such as information relating to the operation of the one or more subscriber devices to provide an example, in an upstream direction 222. The service provider system 200 can utilize this information and, optionally, frequencies of exposure of the one or more subscriber devices to the one or more advertising messages to determine whether to optimize delivery of the one or more advertising messages. The service provider system 200 includes physical layer (PHY) circuitry 202, media access controller (MAC) circuitry 204, and processor circuitry 206. The service provider system 200 can represent an exemplary embodiment of the service provider system 102. For ease of discussion, the service provider system 200 is to be described with respect to the one or more advertising messages; however, those skilled in the relevant art(s) will recognize that the service provider system 200 is capable of communicating other types of information, such as the audio data, the video data, and/or the digital data as described in FIG. 1A and FIG. 1B to provide some examples, without departing from the spirit and scope of the present disclosure.

The PHY circuitry 202 represents an interface between a communication network and the MAC circuitry 204. Generally, the PHY circuitry 202 modulates, encodes, and/or converts an information frame 250 to provide an information signal 252 for transmission to the communication network over a transmission medium in the downlink direction 220. The information frame 250 and/or the information signal 252 can include the one or more advertising messages, as described in FIG. 1A and FIG. 1B, used to promote or to sell a product or service. These one or more advertising messages can be integrated within audio data, video data, such as a television program, movie, or interactive content to provide some examples, and/or digital data, such as one or more webpages of a website, an electronic programing guide, or a software application to provide some examples. Additionally, the PHY circuitry 202 demodulates, decodes, and/or converts an information signal 254 received over the transmission medium to provide an information frame 256 in the uplink direction 222. The information signal 254 can include operational information relating to the operation of the one or more subscriber devices, such as one or more television programs, movies, or interactive contents, or information relating to the one or more television programs, movies, or interactive contents, that the one or more subscriber devices have played, one or more websites, or information relating to the one or more websites, that the one or more subscriber devices have visited, and/or one or more software applications, or information relating to the one or more software applications, that the one or more subscriber devices have executed.

The MAC circuitry 204 represents an interface between the PHY circuitry 202 and the processor circuitry 206. The MAC circuitry 204 manages and maintains communication of the service provider system 200 by coordinating access to the transmission medium and formatting communications in accordance with one or more communication standards or protocols that are supported by the service provider system 200. In the downlink direction 220, the MAC circuitry 204 encapsulates or frames a sequence of bits 258 to provide a payload portion of the information frame 250 and appends a preamble portion of the information frame 250 to the payload portion in accordance with the one or more communication standards or protocols to provide the information frame 250. Otherwise, the MAC circuitry 204 decapsulates or de-frames the information frame 256 in accordance with the one or more communication standards or protocols to provide a payload portion of the information frame 256 as sequence of bits 260. The MAC circuitry 204 can, optionally, authenticate and/or authorize the information frame 256 before decapsulating or de-framing.

The processor circuitry 206 controls overall operation and/or configuration of the service provider system 200. For example, as described above, the information frame 250 and/or the information signal 252 can include the one or more advertising messages that are used to promote or to sell a product or service. This one or more advertising messages can be part of an advertising campaign representing one or more advertisement messages that share one or more ideas and/or themes. In this example, the processor circuitry 206 determines exposure of members of the targeted audience of the advertising campaign to the advertising message. In an exemplary embodiment, the exposure of the members of the targeted audience can be determined by measuring reach and/or average frequency of the one or more advertisement messages.

Thereafter, the processor circuitry 206 determines one or more characteristics, such as reach and/or average frequency to provide some examples, of the exposure of the members of the targeted audience to the advertising message. The processor circuitry 206 then compares the one or more characteristics with one or more previous characteristics of the exposure of the members of the targeted audience to the one or more advertising messages to determine the effectiveness of the advertising campaign. For example, the processor circuitry 206 determines one or more lines tangent to the cumulative reach curve at one or more instances in time and uses one or more slopes of these lines tangent to the cumulative reach curve to determine the effectiveness of the advertising campaign. In this example, when one or more of these slopes of the lines tangent to the cumulative reach curve are horizontal, or substantially horizontal, the advertising campaign is failing to reach the members of the targeted audience that have not been exposed, or are underexposed, to the one or more advertising messages at one or more instances in time.

Finally, the processor circuitry 206 considers optimization of the delivery of the one or more advertising messages when the advertising campaign is failing to reach the members of the targeted audience that have not been exposed, or are underexposed, to the one or more advertising messages. As part of this consideration, the processor circuitry 206 determines an average frequency of exposure of the members of the targeted audience that have been exposed to the one or more advertising messages. The processor circuitry 206 forgoes the optimization of the delivery of the one or more advertising messages until the average frequency of exposure of the members of the targeted audience that have been exposed is greater than or equal to an optimal frequency of exposure as prescribed by the advertising campaign. In an exemplary embodiment, an optimal frequency of exposure of members of the targeted audience to the one or more advertisement messages can be determined by reference to a database repository of conversion analytics which can be based on historical performance of other advertising campaigns or by other means which will be apparent to those skilled in the relevant art(s) without departing from the spirit and scope of the present disclosure. In another exemplary embodiment, the processor circuitry 206 optimizes the delivery of the one or more advertising messages when the advertising campaign is failing to reach the members of the targeted audience that have not been exposed, or are underexposed, to the one or more advertising messages, and the average frequency of exposure of the members of the targeted audience that have been exposed is greater than or equal to an optimal frequency of exposure as prescribed by the advertising campaign.

Exemplary Operation of the Processor Circuitry to Optimize Delivery of One or More Advertising Messages of an Advertising Campaign FIG. 3 graphically illustrates an exemplary audience cumulative reach curve of one or more advertisement messages of an advertising campaign according to an embodiment of the present disclosure. Processor circuitry, such as the processor circuitry 206 to provide an example, uses operational information, as described above in FIG. 1A and FIG. 1B, to measure the exposure of the members of the targeted audience to the one or more advertising messages over time to generate an audience cumulative reach curve 300. As illustrated in FIG. 3, the y-axis of the audience cumulative reach curve 300 represents a cumulative reach, typically as a percentage of the targeted audience, of the advertising campaign. This cumulative reach indicates a number of members of the target audience of the advertising campaign that have been exposed, namely viewed, listened and/or interacted with, to the one or more advertisement messages. The x-axis of the audience cumulative reach curve 300 represents an impression delivery of the advertising campaign. The impression delivery represents an aggregation or accumulation of a number of exposure events in the targeted audience over time. As additionally illustrated in FIG. 3, the region above the audience cumulative reach curve 300 indicates members of the targeted audience that have not been exposed, or are underexposed, to the one or more advertisement messages while the region below the audience cumulative reach curve 300 indicates members of the targeted audience of the service that have been exposed to the one or more advertisement messages.

During the start of the advertising campaign, the cumulative reach of the one or more advertising messages increases rapidly as members of the targeted audience are being exposed to the one or more advertising messages. However, over time, a relative few number of new members of the targeted audience are being exposed to the one or more advertisement messages. In this situation, the cumulative reach of the advertising campaign increases minimally or not at all. As such, the one or more advertisement messages are failing to reach the members of the targeted audience that have not been exposed, or are underexposed, to the one or more advertising messages.

FIG. 4 graphically illustrates an operation to measure an impression delivery of the exemplary audience cumulative reach curve according to an embodiment of the present disclosure. Processor circuitry, such as the processor circuitry 206 to provide an example, determines one or more statistical relationships of the audience cumulative reach curve 300 at one or more instances in time to determine the effectiveness of the advertising campaign. The one or more statistical relationships of the audience cumulative reach curve 300 can be used to measure or quantify the rate of increase of cumulative reach of the one or more advertising messages 300 at the one or more instances in time. As illustrated in FIG. 4, one or more lines tangent to the cumulative reach curve 402, indicated using "dashed" lines in FIG. 4, of one or more points of the audience cumulative reach curve 300 can be used to quantify the rate of increase of cumulative reach of the one or more advertising messages. In an exemplary embodiment, slopes of the one or more lines tangent to the cumulative reach curve 402 can be used to quantify the rate of increase of cumulative reach of the one or more advertising messages at the one or more instances of time. However, those skilled in the relevant art(s) will recognize that another statistical curve, such as a quadric polynomial, a cubic polynomial, a higher-ordered polynomial, or any combination thereof to provide some examples, of best fit for the one or more points of the audience cumulative reach curve 300 can be used to measure or quantify the rate of increase of cumulative reach of the one or more advertising messages without departing from the spirit and scope of the present disclosure.

FIG. 5 graphically illustrates a dynamic interval measurement (DIM) of the exemplary audience cumulative reach curve according to an embodiment of the present disclosure. Processor circuitry, such as the processor circuitry 206 to provide an example, monitors the one or more statistical relationships of the audience cumulative reach curve 300 at intervals of time 502.1 to 502.$k$ to determine the effectiveness of the advertising campaign. As illustrated in FIG. 5, the intervals of time 502.1 to 502.$k$ represent regular automated intervals of time; however, those skilled in the relevant art(s) will recognize that other intervals of time, such as irregular intervals of time, and/or intervals of time that are determined in response to one or more events to provide some examples, can be used without departing from the spirit and scope of the present disclosure. In an exemplary embodiment, when the processor circuitry detects the one or more advertising messages are failing to reach the members of the targeted audience that have not been exposed, or are underexposed, to the one or more advertising messages, for example, consecutive measurements of the slopes of the one or more lines tangent to the cumulative reach curve 402 approaching zero, the processor circuitry can consider to optimize delivery of the one or more advertising messages.

FIG. 6 graphically illustrates an operation to optimize the delivery of the one or more messages of the advertising campaign according to an embodiment of the present disclosure. As illustrated in FIG. 6, processor circuitry, such as the processor circuitry 206 to provide an example, can consider optimizing delivery of one or more advertising messages at time intervals 602.1 through 602.$m$. One or more of the time intervals 602.1 through 602.$m$ represent an instance in time where the processor circuitry detects the one or more advertising messages are failing to reach the members of the targeted audience that have not been exposed, or are underexposed, to the one or more advertising messages. A first time interval 602.1 from among the time intervals 602.1 through 602.$m$ represents an initial optimization of the delivery of the one or more advertising messages. In an exemplary embodiment, the initial optimization represents a start of the advertising campaign.

A second time interval 602.2 from among the time intervals 602.1 through 602.$m$ represents an instance in time where the processor circuitry detects the failing to reach the members of the targeted audience that have not been exposed, or are underexposed, to the one or more advertising messages. In this situation, the processor circuitry can consider to optimize the delivery of the one or more advertising messages. Thereafter, during the second time interval 602.2, the processor circuitry measures an average frequency of exposure of the members of the targeted audience that have been exposed to the one or more advertising messages. In the exemplary embodiment as illustrated in FIG. 6, the average frequency of exposure of the members of the targeted audience that have been exposed to the one or more advertising messages is less than the optimal frequency of exposure as prescribed by the advertising campaign.

An $m^{th}$ time interval 602.$m$ from among the time intervals 602.1 through 602.$m$ represents an instance in time where the processor circuitry detects the failing to reach the members of the targeted audience that have not been exposed, or are underexposed, to the one or more advertising messages and the average frequency of exposure of the members of the targeted audience that have been exposed to the one or more advertising messages is greater than or equal to the optimal frequency of exposure as prescribed by the advertising campaign. In this situation, the processor circuitry can optimize the delivery of the one or more advertisement messages. For example, a program or plan that identifies one or more media channels used in the advertising campaign, often referred to as a media schedule, used to deliver the one or more advertisement messages can be optimized. The media schedule can specify insertion or broadcast dates and/or times for the one or more advertisement messages, positions for the one or more advertisement messages, and/or durations for the one or more advertisement messages to provide some examples. In an exemplary embodiment, this optimization can include recalibrating or reweighting of the media schedule to reach the members of the targeted audience that have not been exposed, or are underexposed, to the one or more advertising messages. This recalibrating or reweighting can include reallocating the media schedule across different dayparts or time periods, such as from off-peak time to prime time to provide an example, across different networks, and/or across different media platforms.

In an exemplary embodiment, once the processor circuitry determines the optimization point, such a second optimization point at the time interval 602.2, and/or an $m^{th}$ optimization point at the time interval 602.$m$ to provide some examples, the processor circuitry generates an advertisement exposure list. In an exemplary embodiment, this list includes the members of the targeted audience that have not been exposed to the one or more advertising messages, the members of the targeted audience that have been exposed to the one or more advertising messages less than the optimal frequency of exposure, and/or the members of the targeted audience that have been exposed to the one or more advertising messages greater than or equal to the optimal frequency of exposure. In this exemplary embodiment, this list can be generated by the processor circuitry at any suitable frequency of exposure or range of exposure frequencies. Typically, the members of the targeted audience that have not been exposed to the one or more advertising messages and/or the members of the targeted audience that have been exposed to the one or more advertising messages less than the optimal frequency of exposure in the advertisement exposure list likely have distinct attributes, such as tuning to different selections of networks and dayparts to provide an example, when compared to those members of the targeted audience that have been exposed to the one or more advertising messages in the advertisement exposure list. In this situation, the delivery of the one or more advertising messages can be optimized in accordance with these distinct attributes to expose the members of the targeted audience that have not been exposed to the one or more advertising messages and/or the members of the targeted audience that have been exposed to the one or more advertising messages less than the optimal frequency of exposure in the advertisement exposure list. For example, the media schedule can be adjusted based on networks and dayparts that are more suitable the members of the targeted audience that have not been exposed to the one or more advertising messages and/or the members of the targeted audience that have been exposed to the one or more advertising messages less than the optimal frequency of exposure in the advertisement exposure list. The advertisement exposure list allows for a real-time, dynamic optimization of the delivery of the one or more advertising messages. Additionally, the advertisement exposure based list export listing can be used to profile the members of the targeted audience to determine characteristics of these members of the targeted audience to more effectively optimize the delivery of the one or more advertising messages. Furthermore, the advertisement exposure list can list the frequency of exposure of the exposed members of the targeted audience and/or a media of exposure, such as television, movies, one or more webpages of a website, an electronic programing guide, a software application to provide some examples. This allows the processor circuitry to determine the frequency of exposure and/or the media of exposure of the members of the targeted audience that have been exposed, or are underexposed, to the one or more advertising messages. For example, this allows the processor circuitry to determine an appropriate media of exposure, such as one or more television programs, one or more movies, one or more interactive contents, one or more webpages of a website, one or more electronic programing guides, one or more software applications to provide some examples, to employ at a given point in the media campaign.

Exemplary Method to Optimize Delivery of the One or More Advertising Messages

FIG. 7 is a flowchart of exemplary operational steps in optimizing delivery of one or more advertising messages of the advertising campaign according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 700 of a service provider system, such as the service provider system 200 to provide an example, in optimizing the delivery of the one or more advertising messages.

At step 702, the operational control flow 700 sends one or more advertising messages of an advertising campaign to members of the targeted audience. The one or more advertising messages can be integrated within audio data, video data, and/or digital data that is provided to the members of the targeted audience of the service. For example, the one or more advertising messages can be placed at specialized locations between various segments of the television program, the movie, or the interactive content, overlaid at specialized locations within the television program, the movie, or the interactive content as the television program, the movie, or the interactive content is being viewed, or placed within various locations of the one or more webpages of the website or the electronic programing guide.

At step 704, the operational control flow 700 monitors one or more characteristics of the exposure of the members of the targeted audience to the one or more advertising messages of step 702. The operational control flow 700 receives operational information from the members of the targeted audience, this information can include one or more television programs, movies, or interactive contents, or information relating to the one or more television programs, movies, or interactive contents, that the subscriber devices 104.1 through 104.n have played, one or more websites, or information relating to the one or more websites, that the subscriber devices 104.1 through 104.n have visited, and/or one or more software applications, or information relating to the one or more software applications, that the subscriber devices 104.1 through 104.n have executed. The one or more characteristics of the exposure of the members of the targeted audience can include a cumulative reach of the one or more advertising messages and/or an average frequency of exposure of the members of the targeted audience that have been exposed to the one or more advertising messages to provide some examples.

At steps 706 and 708, the operational control flow 700 uses the one or more characteristics of step 704 to determine whether to optimize delivery of the one or more advertising messages. At step 706, the operational control flow 700 determines whether the one or more advertising messages are failing to reach members of the targeted audience that have not been exposed, or are underexposed, to the one or more advertising messages, also referred to as new members of the targeted audience. If so, the operational control flow 700 proceeds to step 708. Otherwise, the operational control flow 700 reverts to step 704 to monitor the one or more characteristics of the exposure of the members of the targeted audience to the one or more advertising messages of step 702. At step 708, the operational control flow 700 determines whether the average frequency of exposure of members of the targeted audience that have been exposed to the one or more advertising messages is greater than or equal to the optimal frequency of exposure as prescribed by the advertising campaign. If so, the operational control flow 700 proceeds to step 710. Otherwise, the operational control flow 700 reverts to step 704 to monitor the one or more characteristics of the exposure of the members of the targeted audience to the one or more advertising messages of step 702.

At step 710, the operational control flow 700 generates an advertisement exposure list. In an exemplary embodiment, this list includes the members of the targeted audience that have not been exposed to the one or more advertising messages, the members of the targeted audience that have been exposed to the one or more advertising messages less than the optimal frequency of exposure, and/or the members of the targeted audience that have been exposed to the one or more advertising messages greater than or equal to the optimal frequency of exposure. In this exemplary embodiment, this list can be generated by the operational control flow 700 at any suitable frequency of exposure or range of exposure frequencies.

At step 712, the operational control flow 700 optimizes the delivery of the one or more advertising messages to the members of the targeted audience that have not been exposed to the one or more advertising messages, the members of the targeted audience that have been exposed to the one or more advertising messages less than the optimal frequency of exposure as included in the advertisement exposure list. This optimization preferably occurs when the one or more advertising messages are failing to reach the members of the targeted audience that have not been exposed, or are underexposed, to the one or more advertising messages and the average frequency of exposure of members of the targeted audience that have been exposed to the one or more advertising messages is greater than or equal to the optimal frequency of exposure as prescribed by the advertising campaign. Typically, the members of the targeted audience that have not been exposed to the one or more advertising messages and/or the members of the targeted audience that have been exposed to the one or more advertising messages less than the optimal frequency of exposure in the advertisement exposure list likely have distinct attributes, such as tuning to different selections of networks and dayparts to provide an example, when compared to those members of the targeted audience that have been exposed to the one or more advertising messages in the advertisement exposure list. In this situation, the delivery of the one or more advertising messages can be optimized in accordance with these distinct attributes to expose the members of the targeted audience that have not been exposed to the one or more advertising messages and/or the members of the targeted audience that have been exposed to the one or more advertising messages less than the optimal frequency of exposure in the advertisement exposure list. For example, the media schedule can be adjusted based on networks and dayparts that are more suitable the members of the targeted audience that have not been exposed to the one or more advertising messages and/or the members of the targeted audience that have been exposed to the one or more advertising messages less than the optimal frequency of exposure in the advertisement exposure list. The advertisement exposure list allows for a real-time, dynamic optimization of the delivery of the one or more advertising messages. Additionally, the advertisement exposure based list export listing can be used to profile the members of the targeted audience to determine characteristics of these members of the targeted audience to more effectively optimize the delivery of the one or more advertising messages. Furthermore, the advertisement exposure list can list the frequency of exposure of the exposed members of the targeted audience and/or a media of exposure, such as television, movies, interactive content, one or more webpages of a website, an electronic programing guide, a software application to provide some examples. This allows the operational control flow 700 to determine the frequency of exposure and/or the media of exposure of the members of the targeted audience that have been exposed, or are underexposed, to the one or more advertising messages. For example, this allows the operational control flow 700 to determine an appropriate media of exposure, such as one or more television programs, one or more movies, one or more interactive contents, one or more webpages of a website, one or more electronic programing guides, one or more software applications to provide some examples, to employ at a given point in the media campaign.

CONCLUSION

Although the embodiments of the disclosure described herein refer specifically, and by way of example, to cable modem systems, including cable modem termination systems and cable modems, it will be readily apparent to those skilled in the relevant art(s) that the disclosure is equally applicable to satellite systems, optical communications systems, telephone wire systems, home network systems, and/or any combination thereof. It will be readily apparent to those skilled in the relevant art(s) that the disclosure is applicable to any point-to-multipoint system.

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A cable communications system, comprising:
    physical layer (PHY) circuitry, at a cable modem termination system (CMTS) of the cable communications system, configured to:
        send an advertisement message to a plurality of set-top boxes corresponding to a plurality of members of a targeted audience of an advertising campaign in accordance with a media schedule, and
        receive operational information from the plurality of set-top boxes relating to the advertisement message; and
    processor circuitry, at the CMTS, configured to:
        cause the operational information to be stored in a memory,
        monitor an exposure of the plurality of members to the advertisement message over a plurality of intervals in time by accessing the stored operational information from the memory to generate an audience cumulative reach curve that is to be stored in the memory, the plurality of intervals in time being determined in response to the plurality of members viewing the advertisement message,
        access the stored audience cumulative reach curve from the memory to measure a plurality of rates of change of the audience cumulative reach curve during the plurality of intervals in time,
        detect the advertisement message is failing to reach members that have not been exposed to the advertisement message from among the plurality of members based on consecutive rates of change from among the plurality of rates of change approaching zero,
        access the stored operational information from the memory to measure an average frequency of exposure of members that have been exposed to the advertisement message in response to the advertisement message failing to reach the members that have not been exposed, adjust the media schedule to optimize delivery of the advertisement message in response to the average frequency of the exposure being greater than or equal to an optimal frequency of exposure as prescribed by the advertising campaign, wherein the PHY circuitry is further configured to send the advertisement message to the plurality of set-top boxes in accordance with the adjusted media schedule.

2. The cable communications system of claim 1, wherein the operational information comprises:
  information relating to a television program, a movie, or an interactive content that the plurality of set-top boxes have played;
  information relating to a web site that the plurality of set-top boxes have visited; or
  information relating to a software application that the plurality of set-top boxes have executed.

3. The cable communications system of claim 1, wherein the plurality of rates of change of the audience cumulative reach curve comprises:
  a plurality of slopes of a plurality of lines that are tangent to the audience cumulative reach curve, and
  wherein the processor circuitry is configured to detect that the advertising message is failing to reach the members that have not been exposed when consecutive slopes from among the plurality of slopes are substantially horizontal.

4. The cable communications system of claim 1, wherein the processor circuitry is further configured to forgo optimization of the delivery of the advertisement message when the average frequency of exposure is less than the optimal frequency of exposure.

5. The cable communications system of claim 1, wherein the processor circuitry is configured to reallocate the media schedule across different dayparts or time periods, different networks, or different media platforms to optimize the media schedule.

6. The cable communications system of claim 1, wherein the processor circuitry is further configured to access the stored operational information to generate an advertisement exposure list, and
  wherein the advertisement exposure list includes:
    the members that have not been exposed,
    members that have been exposed to the advertisement message less than the optimal frequency of exposure from among the plurality of members, or
    members that have been exposed to the advertisement message greater than or equal to the optimal frequency of exposure from among the plurality of members.

7. The cable communications system of claim 6, wherein the processor circuitry is further configured to adjust the media schedule to deliver the advertisement message to the members that have not been exposed or the members that have been exposed to the advertisement message less than or equal to the optimal frequency of exposure to optimize the delivery of the advertisement message.

8. A method for optimizing delivery of an advertisement message of an advertising campaign, the method comprising:
  sending, by a cable modem termination system (CMTS) of a cable communications system, the advertisement message to a plurality of set-top boxes corresponding to a plurality of members of a targeted audience of the advertising campaign in accordance with a media schedule;
  storing, by the CMTS, operational information relating to the advertisement message that is received from the plurality of set-top boxes;
  monitoring, by the CMTS, an exposure of the plurality of members to the advertisement message over a plurality of intervals in time by accessing the stored operational information to generate an audience cumulative reach curve that is to be stored, the plurality of intervals in time being determined in response to the plurality of members viewing the advertisement message;
  accessing, by the CMTS, the stored audience cumulative reach curve to measure a plurality of rates of change of the audience cumulative reach curve during the plurality of intervals in time;
  detecting, by the CMTS, the advertisement message are failing to reach members that have not been exposed to the advertisement message from among the plurality of members based on consecutive rates of change from among the plurality of rates of change approaching zero;
  accessing, by the CMTS, the stored operational information to measure an average frequency of exposure of members that have been exposed to the advertisement message in response to the advertisement message failing to reach the members that have not been exposed;
  adjusting, by the CMTS, the media schedule to optimize the delivery of the advertisement message in response to the average frequency of the exposure being greater than or equal to an optimal frequency of exposure as prescribed by the advertising campaign; and
  sending, by the CMTS, the advertisement message to the plurality of set-top boxes in accordance with the adjusted media schedule.

9. The method of claim 8, wherein the operational information comprises:
  information relating to a television program, a movie, or an interactive content that the plurality of set-top boxes have played;
  information relating to a website that the plurality of set-top boxes have visited; or
  information relating to a software application that the plurality of set-top boxes have executed.

10. The method of claim 8, wherein the plurality of rates of change of the audience cumulative reach curve comprises:
  a plurality of slopes of a plurality of lines that are tangent to the audience cumulative reach curve, and
  wherein the detecting comprises:
  detecting that the advertisement message is failing to reach the members that have not been exposed, or are underexposed, when consecutive slopes from among the plurality of slopes are substantially horizontal.

11. The method of claim 8, further comprising:
  forgoing optimization of the delivery of the advertisement message when the average frequency of exposure is less than the optimal frequency of exposure.

12. The method of claim 8, wherein the adjusting comprises:
  reallocating the media schedule across different dayparts or time periods, different networks, or different media platforms.

13. The method of claim 8, further comprising:
  accessing the stored operational information to generate an advertisement exposure list, and wherein the advertisement exposure list includes:
   the members of the targeted audience that have not been exposed,
   members that have been exposed to the advertisement message less than the optimal frequency of exposure from among the plurality of members, or
   members that have been exposed to the advertisement message greater than or equal to the optimal frequency of exposure from among the plurality of members.

14. The method of claim 13, wherein the adjusting comprises:
   adjusting the media schedule to deliver the advertisement message to the members that have not been or the members that have been exposed to the advertisement message less than the optimal frequency of exposure to optimize delivery of the advertisement message.

15. A cable modem termination system (CMTS), comprising:
   a memory that stores operational information received from a plurality of set-top boxes corresponding to a plurality of members of a targeted audience of an advertising campaign, the operational information relating to an advertisement message sent to the plurality of set-top boxes by the CMTS; and
   processor circuitry configured to execute instructions stored in the memory, the instructions when executed by the processor circuitry, configuring the processor circuitry to:
      monitor an exposure of the plurality of members of the targeted audience to the advertisement message over a plurality of intervals in time by accessing the stored operational information from the memory to generate an audience cumulative reach curve that is to be stored in the memory, the plurality of intervals in time being determined in response to the plurality of members viewing the advertisement message,
      access the stored audience cumulative reach curve from the memory to measure a plurality of rates of change of the audience cumulative reach curve during the plurality of intervals in time,
      detect the advertisement message is failing to reach members that have not been exposed to the advertisement message from among the plurality of members based on consecutive rates of change from among the plurality of rates of change approaching zero,
      access the stored operational information from the memory to measure an exposure of members that have been exposed to the advertisement message in response to the advertisement message failing to reach the members that have not been exposed,
      adjust the media schedule to optimize delivery of the advertisement message in response to the exposure of members being greater than or equal to an optimal frequency of exposure as prescribed by the advertising campaign, and
      send the advertisement message to physical layer (PHY) circuitry for delivery to the plurality of set-top boxes in accordance with the adjusted media schedule.

16. The cable communications system of claim 1, wherein the media schedule comprises:
   one or more media channels, broadcast dates, or times configured to deliver the advertisement message, and
   wherein to adjust the media schedule, the processor circuitry is configured to adjust the one or more media channels, the broadcast dates, or the times.

17. The cable communications system of claim 1, wherein the PHY circuitry is configured to send the advertisement message in a channel position dedicated to an advertiser of the advertisement message.

18. The method of claim 8, wherein the media schedule comprises:
   one or more media channels, broadcast dates, or times configured to deliver the advertisement message, and
   wherein the adjusting comprises:
      adjusting the one or more media channels, the broadcast dates, or the times.

19. The method of claim 8, wherein the sending in accordance with the media schedule comprises:
   sending the advertisement message in a channel position dedicated to an advertiser of the advertisement message.

* * * * *